Figure 1:
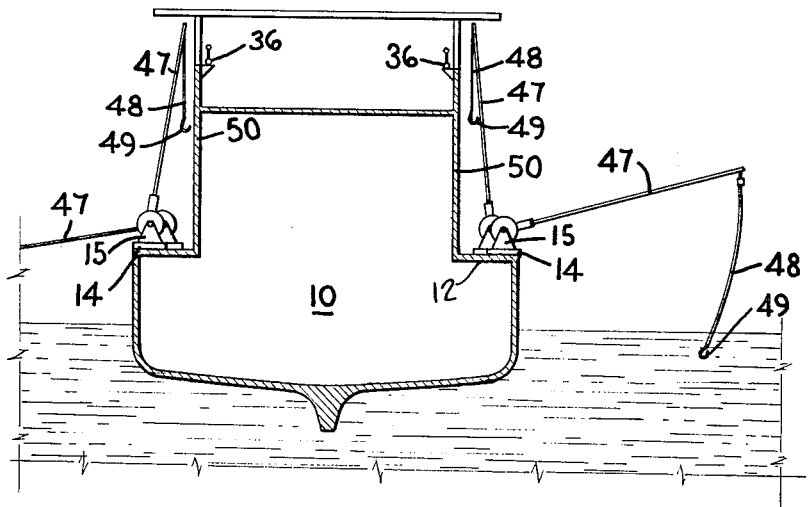

United States Patent Office 3,138,890
Patented June 30, 1964

3,138,890
REMOTELY CONTROLLED POWER OPERATED
FISHING GEAR
Basil D. Mitchell, 216 Esplanade, Seacliff,
South Australia, Australia
Filed May 18, 1962, Ser. No. 195,819
Claims priority, application Australia May 29, 1961
8 Claims. (Cl. 43—6.5)

This invention relates to power operated fishing gear which is suitable for catching certain types of fish, for example, tuna. When catching tuna by the pole method men stand in racks which are hung over the side of the vessel, the bottom of each rack is approximately at water level. The men use flexible (Bamboo) poles on the ends of which are disposed flexible leads or traces carrying hooks without barbs. When a fish is engaged on a hook, one or more operators, depending on the size of the fish, then lift the poles to move the hook upwards and in, usually against a bulwark on the ship, whereupon the fish becomes dislodged from the hook. The pole is then swung back to again cause the hook to trail in the sea.

It will be known that this type of gear is applied to what is known as "soft mouthed" fish, that is, fish where the hook can be torn out of the mouth by a sudden jar, thus making it possible to release the fish from the hook by jarring the line or fish. The same factor, however, introduces a considerable problem in catching the fish because if there is any sudden jar when the fish first takes the hook, the hook will simply pull out of the mouth and the fish will be lost.

When manually catching tuna and fish of this type the operators take the tension on the line slowly, and then gradually accelerate the movement so as not to lose the fish, the pole usually commencing in an almost horizontal position and being swung upwardly until it passes the vertical position, being stopped just after reaching this position.

To simulate this mechanically has been a difficult problem but the object has been achieved by this invention by a particular arrangement of the mechanism which ensures that the means which drive the pole, after a strike is made, take up sufficiently slowly but to then swing the fish up and over clear of the pole to release the fish by a jar at the end of the stroke.

The mechanism for achieving this comprises a base, pole-retaining means rotatable on the base, means between the pole-retaining means and the base operable to partly rotate the pole-retaining means at a regulated rate, a pole secured to and projecting from the pole-retaining means, a flexible trace secured to the projecting end of the flexible pole, a hook on the trace, and control means to regulate the partial rotation of the pole-retaining means.

By inclining the axis of the pole-retaining means somewhat from the horizontal, the fish will be swung clear of the mechanism as it is brought in but it will be obvious that the same effect could be obtained by including the pole to ensure that in its inward sweep the fish will not foul the mechanism.

By using pneumatic operation it is possible to achieve the gradual takeup when the strike is first made and to then give the required acceleration to bring the fish clear of the water and swing same upwardly and inwardly on to the vessel, the mechanism being capable of the required cushioning at the end of the stroke to cause the fish to be thrown clear of the hook after which return of the pole to its catching position can be readily effected.

Figure 2:
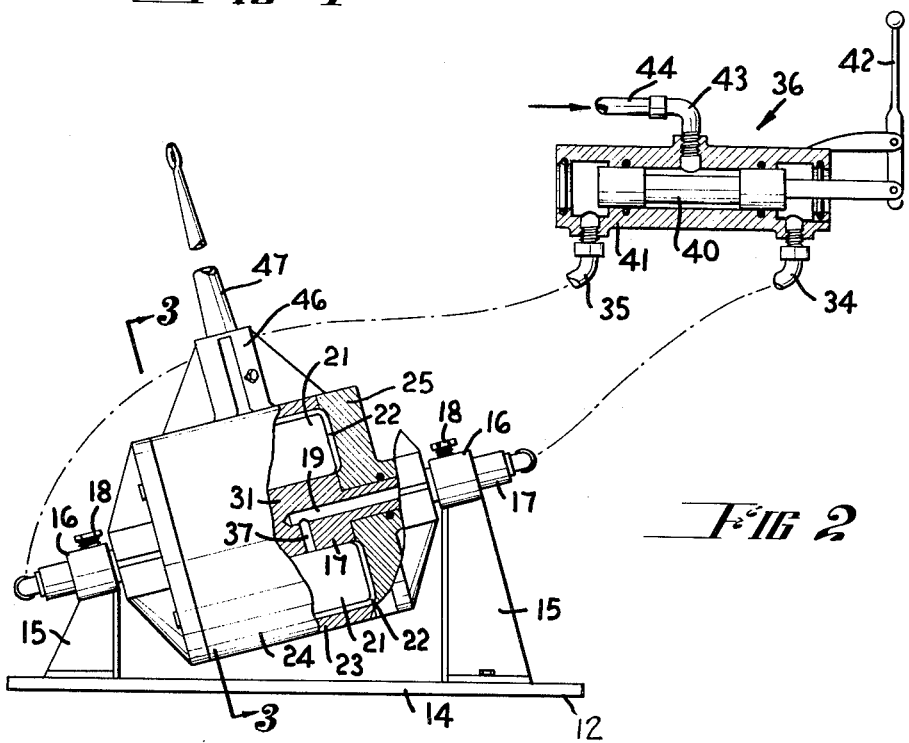
Figure 3:
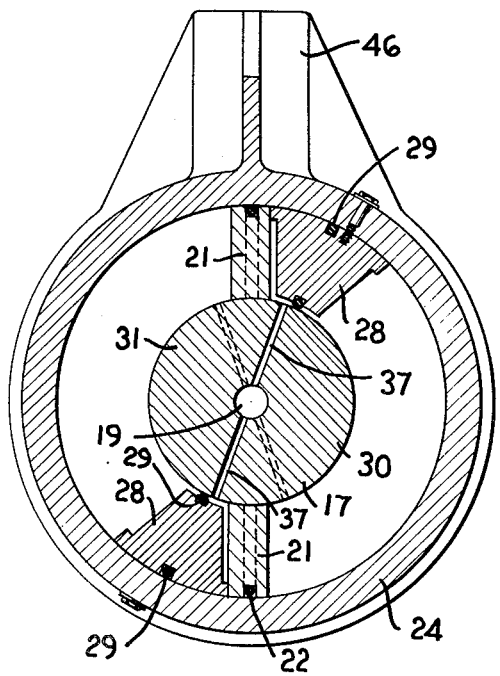

It will be clear that other forms of mechanism can be used to achieve this result, such as for instance, hydraulic mechanism or electrically operated mechanism, but to enable the invention to be more clearly understood certain embodiments will now be described with reference to the accompanying drawings in which:

FIG. 1 is a simplified cross-sectional view of a boat illustrating power operating fishing gear secured to both port and starboard sides, FIG. 2 is a partly sectioned elevation of the base, air cylinder and air valve arrangement utilised in the embodiment of FIG. 1, and FIG. 3 is a cross section taken on lines 3—3 of FIG. 2, but with the pole omitted.

Referring to FIGS. 1, 2 and 3, a boat 10 has secured to its deck 12 on both port and starboard sides a series of power operated fishing gear each of which comprises a base 14 on which is disposed a pair of upstanding brackets 15 which are spaced from each other and each of which terminates in an apertured boss 16, the apertured bosses 16 being in alignment with each other but being elevated at different heights above the base 14. A central axle 17 is secured in the apertured bosses 16 by means of the bolts 18, the central axle 17 being apertured with holes 19 extending end from each end. The central axle 17 also carries on it a pair of diametrically opposite blades 21 which accommodate resilient rubber seals 22, the resilient rubber seals 22 sealably engaging the walls 23 of a drum 24, and also engaging the end plates 25.

The drum 24 has secured to its inner surface a pair of diametrically opposite inwardly directed vanes 28, each vane 28 being completely surrounded by a resilient sealing ring 29 which sealably engages against the outer surface 30 of an enlarged central boss 31 of the central axle 17. The resilient sealing rings 29 also sealably engage against the end plates 25. By this means, the drum 24 with its vanes 28 and its end plates 25 co-operate with the axle 17 and its blades 21 to form a double acting air cylinder, the air being introduced through conduits 34 or 35 from an air valve 36, through the holes 19 and then through the outlet apertures 37 into the space between the blades 21 and 28. The vanes 28 however partially cover the mouths of the outlet apertures 37 so that initial movement tends to be slow, and also so as to provide a cushioning at the end of each stroke.

The valve 36 is of conventional type (being shown somewhat simplified in FIG. 2) and incorporates an axially movable spool 40 within a housing 41, the spool 40 being controlled in its axial movement by means of the lever 42. When the valve lever 42 is moved in one direction, the air is introduced from the central inlet 43 connected by a conduit 44 to an air supply point, and then through the conduit 34 to urge the drum 24 to rotate part of a revolution in one direction, while if the lever 42 is centralised there is no effort tending to urge rotation in either direction. But when the lever 42 is moved in a reverse direction, the air from within the double acting air cylinder confined by the drum and the axle is free to exhaust through the conduit 35.

The drum 24 has a socket 46 which constitutes pole-retaining means, and the socket 46 has secured into it the butt end of a flexible pole 47, the other flexible end of the pole 47 having secured through it a flexible trace 48 which carries a hook 49 thereon.

The control for the device is essentially manually operated, and when a strike is noticed on the hook 49, the operator moves the lever 42 to lift the fish from the water until it strikes the bulwark 50 on the boat, whereby the fish is released from the hook and the pole can be reversed so that the hook again enters the water. Since the drum 24 is disposed at an angle to the base 14, the fish can be moved through the air on an arc whereby it will be unlikely to contact the pole or any of the operating mechanism. It will be seen that the operating mechanism is small in size, and the air cylinder in being positioned about the axis of rotation and immediately adjacent thereto provides a considerable degree of resilience to the swinging end of the pole 47. Whereas with other arrangements this resilience is somewhat dampened by friction, the damping with the arrangement shown in this embodiment is kept to a minimum so that danger of fish loss due to sudden acceleration is largely avoided. Furthermore the inertia of the moving parts is reduced considerably.

It is found that by maintaining a sufficient degree of resilience in mechanism, by keeping the frictional values small and using high air pressures, and by manual control of the air valve 36, it is possible to greatly facilitate the landing of fish such as tuna. When fishing in a good biting school, one person is able to control two units thus doing the work of two persons, while this saving is increased still further for larger fish in excess of forty pounds weight.

What I claim is:

1. Power operated fishing gear comprising, a base, brackets on said base, an axle locked on said brackets, a drum including a cylindrical wall and end plates, said drum surrounding the said axle and journalled thereon, an inwardly directed vane secured in said drum sealably engaging the axle, an outwardly directed vane on said axle sealably engaging the cylindrical wall and end plates of the drum, said axle constituting conduit means opening into said drum thereby to allow pressure fluid therein alternatively to be forced into said drum or exhausted therefrom to thereby rotate said drum alternatively in either direction about said axle, a pole-retaining socket on the said drum, a pole engaged at its butt end in said pole-retaining socket, a trace on the outer end of said pole, a hook on said trace, a control valve to regulate the flow of pressure fluid into and out of the hollow axle, and further pressure fluid conduits between the control valve and the axle.

2. Power operated fishing gear comprising, a base, brackets on said base, an axle locked on said brackets, a drum including a cylindrical wall and end plates, said drum surrounding the said axle and rotational thereon, a pair of opposite inwardly directed vanes secured in said drum sealably engaging the axle and thereby dividing the space within the drum into two compartments, a pair of opposite outwardly directed vanes on said axle sealably engaging the cylindrical wall and end plates of the drum and thereby subdividing the compartments, said axle constituting conduit means opening into said compartments thereby to allow pressure fluid therein alternatively to be forced into said compartments or exhausted therefrom to thereby rotate said drum alternatively in either direction about said axle, pole-retaining means on the said drum, a pole engaged at its butt end in said pole-retaining means, extending outwardly therefrom and inclined to the base, a trace on the outer end of said pole, a hook on said trace, a control valve to regulate the flow of pressure fluid into and out of the hollow axle, and further pressure fluid conduits between the control valve and the axle.

3. Power operated fishing gear comprising, a base, brackets on said base, an axle locked on said brackets in a position inclined to the base, a drum including a cylindrical wall and end plates, said drum surrounding the said axle and rotational thereon, a air of opposite inwardly directed vanes secured in said drum sealably engaging the axle and thereby dividing the space within the drum into two compartments, a pair of opposite outwardly directed vanes on said axle sealably engaging the cylindrical wall and end plates of the drum and thereby subdividing the compartments, said axle constituting conduit means opening into said compartments thereby to allow pressure fluid therein alternatively to be forced into said compartments or exhausted therefrom to thereby rotate said drum alternatively in either direction about said axle, pole-retaining means on the said drum, a pole engaged at its butt end in said pole-retaining means, a trace on the outer end of said pole, a hook on said trace, a control valve to regulate the flow of pressure fluid into and out of the hollow axle, and further pressure fluid conduits between the control valve and the axle.

4. Power operated fishing gear comprising, a base, brackets on said base, an axle locked on said brackets in a position inclined to the base, a drum including a cylindrical wall and end plates, said drum surrounding the said axle and rotational thereon, an inwardly directed vane secured in said drum, inwardly directed walls in the said inwardly directed vane defining a groove therein and a sealing ring in said groove sealably engaging the axle, an outwardly directed vane on said axle, inwardly directed walls in the outwardly directed vane defining a second groove therein and a rubber seal in the second groove sealably engaging the cylindrical wall and end plates of the drum, said axle constituting conduit means opening into said compartments thereby to allow pressure fluid therein alternatively to be forced into said compartments or exhausted therefrom to thereby rotate said drum alternatively in either direction about said axle, pole-retaining means on the said drum, a pole engaged at one end in said pole-retaining means, a trace on the other end of said pole, a hook on said trace, a control valve to regulate the flow of pressure fluid into and out of the hollow axle, and further pressure fluid conduits between the control valve and the axle.

5. Power operated fishing gear comprising, a base, brackets on said base, an axle secured in said brackets, a drum including end plates and a cylindrical wall, said drum surrounding the said axle and rotational thereon, an inwardly directed vane secured in said drum, an outwardly directed vane on said axle sealably engaging the cylindrical walls and end plates of the drum, said axle constituting conduit means communicating with apertures opening into said drum to thereby allow pressure fluid to be forced into said drum or be exhausted therefrom to thereby rotate said drum alternatively in either direction about said axle, said apertures being partially covered by the inner ends of the inwardly directed vane at the end of stroke, pole-retaining means on the said drum, a flexible pole engaged at one end in said pole-retaining means and extending therefrom inclined to the base, a trace on the other end of said pole, a hook on said trace, a control valve operable to regulate the flow of fluid into and out of the hollow axle, and further pressure fluid conduits between the control valve and the axle.

6. Power operated fishing gear comprising, a base, brackets on said base, an axle secured in said brackets, a drum including end plates and a cylindrical wall, said drum surrounding the said axle and rotational thereon, an inwardly directed vane secured in said drum, inwardly directed walls in said vanes defining a groove therein and a resilient sealing ring in said groove, an outwardly directed vane on said axle, inwardly directed walls extending around said outwardly directed vane defining a second groove therein and a rubber seal in the second groove of the outwardly directed vane sealably engaging the cylindrical walls and end plates of the drum, said axle constituting conduit means, the walls of the conduit means defining at their terminal points apertures opening into said drum to thereby allow pressure fluid to be forced thereinto or exhausted therefrom to thereby rotate said drum alternatively in either direction about said axle, said apertures being partially covered by the inner ends of the inwardly directed vane at the end of stroke, pole-retaining means on the said drum, a flexible pole engaged at one end in said pole-retaining means, a trace on the other end of said pole, a hook on said trace, a control valve operable to regulate the flow of fluid into and out of the hollow axle, and further pressure fluid conduits between the control valve and the axle.

7. Power operated fishing gear comprising, a base, brackets on said base, bosses on the brackets, an axle in said bosses in a position inclined relative to the base, means locking the axle in the bosses to thereby prevent rotation, a drum including end plates and a cylindrical wall, said drum surrounding the said axle and rotational thereon, inwardly directed vanes secured in said drum dividing the space within the drum into two compartments, inwardly directed walls defining first grooves surrounding said vanes and resilient sealing rings in said first grooves, outwardly directed vanes on said axle, inwardly directed wall defining second grooves extending around said outwardly directed vanes and rubber seals in said second grooves sealably engaging the cylindrical walls and end plates of the drum whereby the outwardly directed vanes subdivide the compartments, said axle constituting conduit means, the walls of the conduit means defining at their terminal points apertures opening into both subdivisions of each compartment to thereby allow pressure fluid to be forced into opposite pairs of subdivisions of compartments or exhausted therefrom to thereby rotate said drum alternatively in either direction about said axle, said apertures being partially covered by the inner ends of the inwardly directed vanes at the end of stroke, pole-retaining means on the said drum, a flexible pole engaged at one end in said pole-retaining means, a trace on the other end of said pole, a hook on said trace, a control valve operable to regulate the flow of fluid into and out of the hollow axle, and further pressure fluid conduits between the control valve and the axle.

8. Power operated fishing gear comprising a drum, end plates on the drum, bearings disposed centrally in drum end plates, an axle journalled in said bearings, vanes on the axle slidably engaging the inner surfaces of the drum and vanes in the drum slidably engaging the axle, the axle and the drum constituting relatively rotatable elements of a part-rotary pneumatic cylinder, a base fixedly supporting one of said rotatable elements, pole retaining means on the other of said rotatable elements, a flexible pole retained at its butt end by said retaining means, the flexible pole extending outwardly from said retaining means and inclined relative to the base, a flexible trace secured to the outer end of the flexible pole, a hook on the trace, and an air valve operatively connected to the pneumatic cylinder for control of movement thereof and consequent control of partial rotation of the flexible pole.

References Cited in the file of this patent
UNITED STATES PATENTS

| | | |
|---|---|---|
| 1,502,781 | Jamison | July 29, 1924 |
| 2,548,038 | Moliskey | Apr. 10, 1951 |
| 2,643,477 | Silva | June 30, 1953 |